United States Patent Office 3,377,044
Patented Apr. 9, 1968

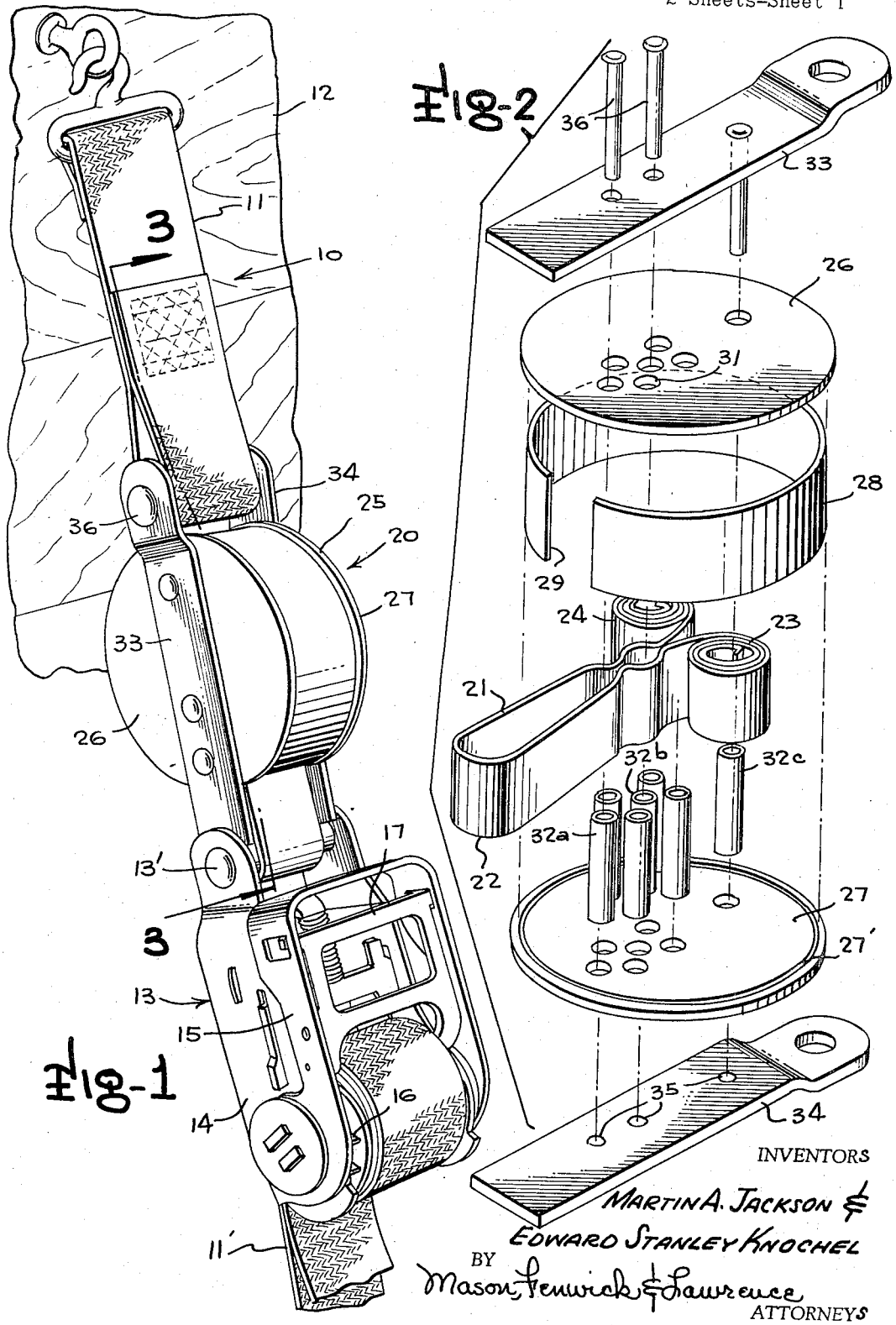

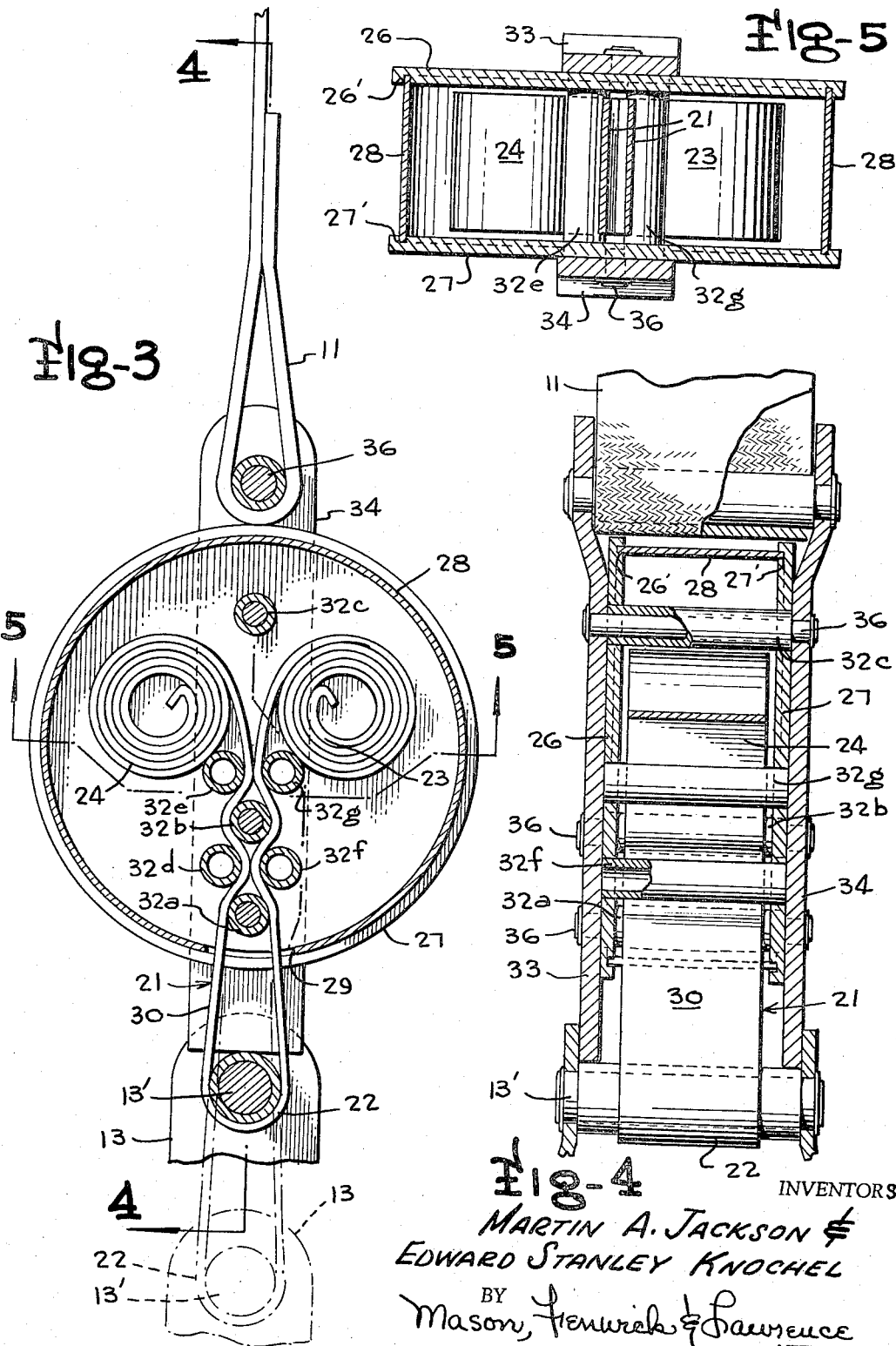

3,377,044
CARGO TIE-DOWN APPARATUS
Martin A. Jackson, Bradshaw, and Edward Stanley Knochel, Baltimore, Md., assignors to Van Zelm Associates, Incorporated, Baltimore, Md., a corporation of Maryland
Filed Mar. 2, 1966, Ser. No. 531,221
6 Claims. (Cl. 248—361)

ABSTRACT OF THE DISCLOSURE

A cargo tie-down assembly including a pair of tie-down strap sections and a metal bender energy absorber intercoupling the two strap sections together comprising a container coupled to one strap section and a metal element having coils at both ends thereof housed in the container and coupled at substantially its midpoint with the other strap section, the metal element being bent beyond its elastic limit during extraction from the container responsive to dynamic loads on the assembly to absorb a proportion of the energy of the dynamic loads.

Summary of the invention

The cargo tie-down assembly of the present invention includes a pair of tie-down straps, for example, of web fabric, to be coupled in series relation between cargo and a cargo floor ring or anchor, between which strap sections is a metal bender energy absorber. The energy absorber includes a container of cylindrical or drum-shaped configuration secured to one strap section having an exit passage and cylindrical deforming members within the container adjacent the exit passage defining serpentine paths for extraction of a steel tape from the container. The steel tape is formed at its midpoint with an exposed bight or loop connected to the other strap section and has oppositely curved coils formed at both ends of the tape and housed within the container, the steel tape being drawn through the serpentine paths and bent by the deforming members beyond its elastic limit during extraction of the tape from the container by dynamic loads on the assembly to absorb a portion of the energy of the dynamic loads.

The present invention relates in general to cargo tie-down mechanism for use in securing cargo loads to movable supporting paltforms, such as aircraft, wheeled vehicles, and the like, and more particularly to such cargo tie-down mechanisms having energy absorber means incorporated therein to minimize breakage of components of the tie-down mechanism and release of the cargo load under temporary peak load conditions occurring during crashes, collisions, and the like.

While the present invention is applicable to a variety of cargo tie-down installations and requirements, and to many different types of cargo load supporting platforms by which the cargo is transported, the invention is particularly designed for use in securing cargo loads against movement or dislodgement in aircraft and will be particularly described in connection with that application.

Heretofore, it has been customary to tie down cargo in the cargo compartment of an aircraft by securing the same by means of tie-downs to floor cargo rings. The tie-downs are customarily of heavy web fabric material, chain, or cable having suitable load limit characteristics such that a plurality of such tie-downs will collectively withstand normal loads and prevent undesired movement of the cargo from its selected position. The floor cargo rings are customarily designed to withstand peak loads of a certain design value adequate to normally prevent undesirable movement of the cargo, for example, loads of about 5,000 pounds. It has been found, however, that release of the cargo and disastrous consequences may occur under certain abnormal circumstances, such as when the aircraft is in process of making a belly landing or forced landing, wherein the aircraft is subjected to very rapid abnormal deceleration. In such cases, breakage of one of the plurality of tie-downs or failure of one of the floor cargo rings arising from the very high momentary peak load of the cargo, particularly the forward component of such peak loads, imposes the full cargo load on the remaining tie-downs and cargo rings, now less than the original number sharing the load, causing progressive failure of tie-downs or cargo rings and ultimate release of the cargo to slide into the pilot's compartment with seriously injurious or fatal results to the pilot and crew.

By incorporating energy absorber units, especially energy absorbers of the metal bender type in each cargo tie-down assembly, the momentary peak loads in excess of the tie-down cargo rings breaking strength can be sufficiently diminished by the kinetic energy of the dynamic load absorbed by the energy absorber unit to prevent or deter failure of any of the tie-down anchor ring assemblies, and thereby secure the cargo against dislodgement under such emergency landing or rapid deceleration conditions.

An object of the present invention, therefore, is the provision of a novel cargo tie-down mechanism or assembly incorporating a metal bender type energy absorber therein to absorb the kinetic energy of peak dynamic loads in excess of selected values below the load limits of the other components of the tie-down mechanism to prevent or resist accidental failure of the tie-down unit.

Another object of the present invention is the provision of a cargo tie-down mechanism or assembly of the type described in the preceeding paragraph, wherein the metal bender type energy absorber is of a novel compact construction suited to the space requirement and conditions obtaining in aircraft cargo compartments.

Another object of the present invention is the provision of a metal bender type energy absorber of novel compact construction particularly suitable for use as a component in a cargo tie-down assembly for securing cargo loads against accidental displacement relative to an associated transport platform therefor.

Other objects, advantages and capabilities of the present invention will become apparent from the following detailed description taken in conjunction with the accompanying drawings illustrating a preferred embodiment of the invention.

In the drawings:

FIGURE 1 is a perspective view of a portion of a cargo tie-down assembly illustrated in position of use relative to a cargo load, showing a metal bender energy absorber incorporated therein in accordance with the present invention;

FIGURE 2 is an exploded perspective view of the metal bender absorber unit constructed in accordance with the present invention;

FIGURE 3 is a vertical section view of the metal bender energy absorber unit and adjacent components of the cargo tie-down assembly taken along the line 3—3 of FIGURE 1;

FIGURE 4 is a vertical section view transverse to the section plane of FIGURE 3 taken along the line 4—4 of FIGURE 3; and FIGURE 5 is a section view taken along the line 5—5 of FIGURE 3.

Referring to the drawings wherein like reference characters designate corresponding parts throughout several figures the cargo tie-down mechanism or assembly of the present invention, the significant components of which are illustrated in FIGURE 1, is indicated generally by the reference character 10 and comprises the usual tie-down strap 11 which may be of suitable web fabric material similar to the type used for aircraft or automotive safety belts and the like, designed to be anchored at one end to the cargo, reference character 12, the strap 11 being coupled at its other end to a suitable tensioning device 13 which in turn is connected to a further tie-down strap section 11' secured at its other end to a cargo floor ring. The strap tensioning mechanism 13 herein illustrated is of a commercially available ratchet type, having for example a main frame 14 and a U-shaped handle frame 15 pivotally coupled thereto carrying a pawl engageable with ratchet teeth 16 for driving the ratchet mechanism in a strap tightening direction upon oscillatory movement of handle frame 15 relative to the main frame 14. In this specific tensioning mechanism, a suitable quick release actuator slide 17 is provided which may be selectively actuated to rapidly pay out and release the lower tie-down strap section 11'. It will be appreciated, however, that this specific tensioning mechanism 13 has been described merely by way of example as a suitable tensioning mechanism found to be well suited for use in the cargo tie-down assembly of the present invention and that other known tensioning mechanisms, such as turnbuckles, overcenter tensioners, releasable buckle mechanisms of various types and other well known tensioning devices may be used.

The metal bender energy absorber unit, indicated generally by the reference character 20 is intercoupled between the upper tie-down strap section 11 and the tensioning mechanism 13 or lower strap section 11', and may be the general type disclosed in earlier U.S. Patents Nos. 2,979,163, 2,980,213, 3,017,163, or 3,211,260, for example all of which are assigned to the assignees of this application. Such metal bender energy absorber units generally employ an elongated metal element such as a strap, rod, or a filament of metal, most frequently in the form of steel tape or steel strap, which is coiled and placed within a generally cylindrical cavity in a container, one end of the strap being anchored within the container or loosely coiled therein and the other end portion being passed over and under a series of cylindrical surfaces provided by rollers, peglike members or the like, defining a generally serpentine path along which the steel tape is drawn to deform at beyond its elastic limit.

A retarding force can thus be obtained proportional to the number of reversed bends in the metal tape opposing forces tending to pull the tape from the coil and absorbing the kinetic energy of dynamic loads tending to withdraw the tape from the coil. The metal bender energy absorber unit of the present invention, when employed in cargo tie-down assembly applications herein described, is preferably of the particular construction herein illustrated in detail in FIGURES 2 through 5, wherein the steel tape 21 is bent at its mid point to form an exposed bite or loop 22 which is trained about a rivet, bolt or connecting pin 13' of the main frame 14 of the tensioning device 13 and has a pair of end portions disposed relatively more remote from the tensioning device formed into tightly wound oppositely curved coils 23, 24 housed within the container 25. The container 25 is formed simply by a pair of cylindrical end plates 26, 27 of the same diameter having grooves 26', 27' cut adjacent the periphery thereof for receiving and locating the edges of a cylindrical side wall member 28 defining a cylindrical cavity with the end plates 26, 27 and interrupted over a narrow arcuate segment thereof to define an opening 29 facing toward the tensioning mechanism 13 for passage of the externally projecting portions 30 of tape 21 therethrough. The end plates 26, 27 are drilled to provide a plurality of suitably located cylindrical openings 31, seven being provided in each end plate in the herein illustrated embodiment, size to receive the ends of cylindrical sleeves or tube members 32 therein, the end plates 26, 27 being outwardly flanked by elongated plate members 33 and 34, which have openings 35 therein of smaller diameter than the openings 31 aligned along the diametric axis of the container 25 extending through the center of the opening 29. The openings 35 in the plate members 33, 34 are sized to just accommodate fastening members such as bolts, or small pins 36, which extend therethrough and through the bores of the three sleeves or tube members 32a, 32b and 32c aligned with said diametric axis of the containers, the fastening members 36 being headed, deformed, or otherwise provided with enlargements immediately outwardly of the plate members 33, 34 to retain the whole assembly in an assembled relation. It will be apparent that the portions of the plate members 33, 34 which outwardly overlie the openings 31 in the end plate 26, 27 define bottomed sockets into which the ends of the sleeves or tube members 32 are nested to restrain them in the desired positions. The sleeves or tube members 32d and 32e to one side of said diametric axis and the members 32f and 32g to the other side of the diametric axis are so staggered and located relative to the members 32a and 32b as to define a serpentine path for the two portions of the steel tape 21 extending therebetween to cause the steel tape portions to undergo reverse bends straining the same beyond the elastic limit and providing the kinetic energy absorption desired when a withdrawing force is exerted upon the connecting pin 13' and the bite 22 of the steel tape 21 trained thereabout. The upper end portions of the flanking plate members 33, 34 projecting beyond the perimeter of the container 25 are suitably apertured to support a connecting pin 36 extending through a loop formed in the end of the cargo tie-down strap section 11 to complete the assembly.

In operation of the cargo tie-down assembly under short duration peak load conditions exceeding a preselected load level, as when the cargo is undergoing abnormally rapid deceleration forces during emergency belly landings or similar conditions, the forces apply to the bite portion 22 of the steel tape 21 tending to withdraw the connecting pin 13' and the steel tape bite portion 22 in a direction away from the center of the container 25 the portions of the steel tape 21 between the coils 23, 24 and the bite 22 will be drawn along the serpentine paths defined by the sleeve or tube members 32 to successively and progressively bend the steel tape beyond the elastic limit of the metal and thereby absorb a proportion of the kinetic energy of the dynamic load to maintain the load imposed on the remaining components of the tie-down assembly below their yield values and thereby minimize the possibility of failure of such other components. The energy absorber in one practical example of this load limiter has a maximum yield load of about 5,000 pounds, a minimum yield load of about 4,500 pounds, and a stroke of 1 foot.

It will be appreciated that the cylindrical surfaces defining the serpentine paths for the steel tape may have structural forms different from that herein illustrated, such for example, as solid pegs or rods, or freely rotating rollers of various types, the important feature being that the metal bending elements provide substantially cylindrically curved surfaces at the portions thereof engaged by the steel tape and that such cylindrically curved surface portions be so located relative to each other as to define a substantially serpentine path or a path having reverse bends therealong which would strain the tape beyond its elastic limit and thereby absorb kinetic energy.

While only one form of the present invention has been particularly shown and described, it will be apparent that various modifications may be made within the spirit and scope of the invention, and it is desired, therefore, that only such limitations be placed on the invention as are imposed by the prior art and set forth in the appended claims.

In the claims:

1. A cargo tie-down assembly for securing a cargo load against movement relative to a cargo supporting transport platform, wherein the tie-down assembly is coupled to the load and to anchor means of the platform at selected anchor points, comprising an elongated flexible tie-down member to be secured at one of said anchoring points to the cargo load and coupled at another of said anchoring points to said anchor means to restrain the cargo load in a selected position, a metal bender energy absorber means coupled to said tie-down member in series relation therewith between said anchor points for diminishing energy of peak dynamic loads on said tie-down member to values below the load limits of the tie-down member and anchor means, said energy absorber means comprising an elongated bendable metal element and deforming means engaging the same with respect to which the metal element moves responsive to dynamic loads on said tie-down assembly above a selected value to progressively and successively bend increments thereof beyond their elastic limit and thereby absorb a proportion of the energy of said dynamic loads, said energy absorber means comprising a container having an exit passage through which said metal element may be extracted, said metal element having coils formed at both ends thereof housed in said container and an intermediate portion extending through said exit passage including a bend at substantially its midpoint defining a coupling portion disposed externally of said container with a pair of intervening metal element sections extending between said coupling portion and said coils, said deforming means defining a pair of separate serpentine paths for concurrently progressively and successively bending increments of both of said metal element sections during extraction thereof from said container, and means connecting said container and said coupling portion respectively to portions of said tie-down assembly which are forced in opposite directions responsive to said dynamic loads.

2. A cargo tie-down assembly as defined in claim 1, wherein said container is of substantially cylindrical configuration having a pair of circular end plates, said deforming means comprising a first set of cylindrical surface members extending between said end plates with their axes disposed in a diametric plane of the container at spaced radial positions and second and third sets of cylindrical surface members having axes parallel to the axes of said first set disposed in planes paralleling said diametric plane and spaced equally and in opposed directions therefrom at staggered locations relative to the cylindrical surface members of said first set to define said pair of serpentine paths.

3. A cargo tie-down assembly as defined in claim 1 wherein said tie-down assembly includes a first flexible connecting member to be coupled at one end to the cargo load and connected at its other end to said container, a second flexible connecting member to be connected at one end to one of the anchoring means, and releasable coupling means connected to the other end of said second connecting member and to said coupling portion of said metal element to selectively connect and disconnect the tie-down assembly intermediate said anchor points.

4. A cargo tie-down assembly as defined in claim 3 wherein said releasable coupling means is an adjustable tensioning device for varying the tension of said connecting members.

5. A metal bender energy absorber for absorbing a proportion of the kinetic energy of peak dynamic loads imposed thereon comprising a container defining a cavity having an exit passage therefrom, an elongated bendable metal ribbon having a bend at substantially the longitudinal midpoint thereof disposed externally of said container and a pair of oppositely directed coils formed at the two ends thereof disposed within said cavity, said metal ribbon having a pair of similar intermediate sections defined by the respective portions thereof extending between said bend and said pair of coils, and deforming means in said container adjacent said intermediate sections of said metal ribbon having alternately staggered cylindrical surface portions defining a pair of separate serpentine paths along which said intermediate sections may be moved during extraction of said ribbon from said container for concurrently progressively and successively bending increments of both said intermediate sections beyond their elastic limits and thereby absorb a proportion of the energy of said dynamic loads.

6. A metal bender energy absorber as defined in claim 5 wherein said container is of substantially cylindrical configuration having a pair of circular end plates, said deforming means comprises a first set of cylindrical surface members extending between said end plates with their axes disposed in a diametric plane of the container at spaced radial positions and second and third sets of cylindrical surface members having axes parallel to the axes of said first set disposed in planes paralleling said diametric plane and spaced equally and in opposed directions therefrom at staggered locations relative to the cylindrical surface members of said first set to define said pair of serpentine paths.

References Cited
UNITED STATES PATENTS

| | | | |
|---|---|---|---|
| 2,578,753 | 12/1951 | Smith | 188—1 |
| 2,979,163 | 4/1961 | Van Zelm et al. | 188—1 |
| 2,980,213 | 4/1961 | Van Zelm et al. | 188—1 |
| 3,114,337 | 12/1963 | Kloss | 248—361 X |
| 3,140,850 | 7/1964 | Packard | 248—361 |
| 3,211,260 | 10/1965 | Jackson | 188—1 |

ROY D. FRAZIER, *Primary Examiner.*

F. DOMOTOR, *Assistant Examiner.*